United States Patent [19]

Shippey

[11] 4,155,853

[45] May 22, 1979

[54] REVERSE OSMOSIS CELL WITH MULTI-CONDUIT OSMOTIC MEMBRANE ELEMENT

[76] Inventor: Frank R. Shippey, 2965 Dogwood Cir., Thousand Oaks, Calif. 91360

[21] Appl. No.: 843,481

[22] Filed: Oct. 19, 1977

[51] Int. Cl.² .................................................. B01D 31/00
[52] U.S. Cl. .................................. 210/342; 210/321 R; 210/433 M
[58] Field of Search ............ 210/496, 500 M, 321 R, 210/342, 23 H, 433 M

[56] References Cited

U.S. PATENT DOCUMENTS

| | | | |
|---|---|---|---|
| 2,598,322 | 5/1952 | Vokes | 210/342 X |
| 3,396,103 | 8/1968 | Huntington | 210/342 X |
| 3,712,473 | 1/1973 | Ellenburg | 210/321 R |
| 4,032,454 | 6/1977 | Hoover et al. | 210/496 X |

*Primary Examiner*—Frank A. Spear, Jr.
*Attorney, Agent, or Firm*—Donald Diamond

[57] ABSTRACT

A reverse osmosis cell is provided which includes a pressure vessel having pressurized fluid inlet means, concentrate fluid outlet means, and permeate fluid outlet means. A hollow, open-ended, rigid, porous, tubular member is disposed within the pressure vessel in spaced relationship to the inner surface thereof, with the spaced relationship defining an outer conduit which is in communication with the concentrate outlet. The tubular member comprises a wall delimited by inner and outer surfaces and oppositely disposed first and second wall ends, with each of the inner and outer wall ends being coated with a semi-permeable membrane, and with the inner surface defining an inner conduit. The tubular wall is provided with axially disposed wall conduit means terminating in first and second port means in the first and second wall ends, respectively. Fluid distributor means are disposed at the second wall end of the tubular member and include (a) first transfer conduit means for extending communication from the wall conduit second port means to the permeate outlet and (b) second transfer conduit means for extending communication from the inner conduit at the second wall end to the outer conduit. Sealing means are provided for preventing fluid migration between the first and second transfer conduit means and for sealing the first wall end of the tubular member.

9 Claims, 10 Drawing Figures

REVERSE OSMOSIS CELL WITH MULTI-CONDUIT OSMOTIC MEMBRANE ELEMENT

BACKGROUND OF THE INVENTION

This invention relates to reverse osmosis cells for separating pressurized fluid systems into concentrate and permeate fluids.

In reverse osmosis, an adequately pressurized fluid system containing solvent and solute is applied to a suitably supported and housed semipermeable membrane which results in solvent passing through the semipermeable membrane while the initial fluid system becomes more concentrated with respect to the solute originally contained therein.

The support for the semipermeable membrane is frequently referred to in the art as a membrane element and varying designs and configurations for this element have been disclosed in the published art. The invention herein is particularly directed to the use of rigid membrane elements which have a porous structure and a tubular configuration. A method for making porous, tubular, ceramic membrane elements is described in U.S. Pat. No. 3,442,995 (A. L. Bennett et al, 1969); and a method for producing a semipermeable membrane coating on a membrane element from a composition containing cellulose acetate is described in U.S. Pat. No. 3,483,282 (Manjikian, 1969).

The use of porous tubular structures as membrane elements in the reverse osmosis treatment of fluid systems offers advantages over other membrane element forms in that higher pressures can be employed which permit the processing of more viscous fluids or fluids containing suspended solids or higher concentrations of solute.

In U.S. Pat. No. 3,400,825 (Shippey, 1968), there is disclosed a reverse osmosis cell which incorporates a rigid, porous, tubular membrane element provided with a semipermeable membrane coating on its outer surface. The coated membrane element, which is provided with an axial bore for collecting and transporting permeate fluid, is disposed within a pressure vessel having pressurized fluid inlet means, concentrate fluid outlet means and permeate fluid discharge means. Connector means including sealing means are provided for extending communication from the axial bore to the permeate discharge means.

The utilization efficiency of the osmotic membrane element disclosed in U.S. Pat. No. 3,400,825 is a function of the surface area of the semipermeable membrane coating to which pressurized fluid is applied. It would, of course, be advantageous to improve the utilization efficiency of the osmotic membrane element without making any significant changes in the gross dimensions thereof.

SUMMARY OF THE INVENTION

In accordance with this invention, there is provided a reverse osmosis cell having an improved osmotic membrane element for resolving a pressurized fluid system into concentrate and permeate fluids.

The cell includes a pressure vessel having pressurized fluid inlet means, concentrate fluid outlet means, and permeate fluid outlet means. A hollow, open-ended, rigid, porous, tubular member is disposed within the pressure vessel in spaced relationship to the inner surface thereof, with the spaced relationship defining an outer conduit which is in communication with the concentrate outlet. The tubular member comprises a wall delimited by inner and outer surfaces and oppositely disposed first and second wall ends, with each of the inner and outer surfaces being coated with a semipermeable membrane, and with the inner surface defining an inner conduit. The tubular wall is provided with axially disposed wall conduit means terminating in first and second port means in the first and second wall ends, respectively. Fluid distributor means are disposed at the second wall end of the tubular member and include (a) first transfer conduit means for extending communication from the wall conduit second port means to the permeate outlet and (b) second transfer conduit means for extending communication from the inner conduit at the second wall end to the outer conduit. Sealing means are provided for preventing fluid migration between the first and second transfer conduit means and for sealing the first wall end of the tubular member.

DETAILED DESCRIPTION

Figure 1:
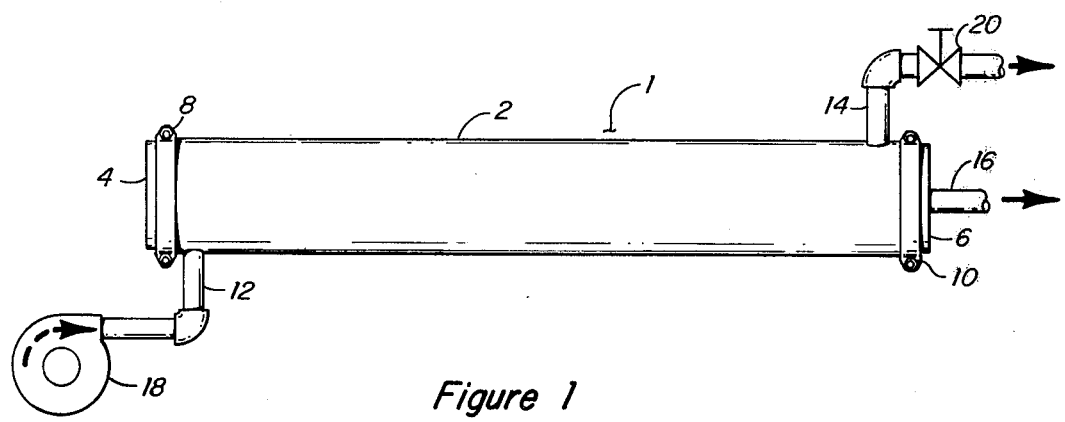
FIG. 1 is a diagramatic overview of the reverse osmosis cell of this invention.

Referring now to the drawings and, in particular, to FIG. 1 there is shown a pressure vessel 1 comprising a hollow open-ended, tubular shell 2 having first and second end closures 4, 6 removably secured to the opposite ends of the shell by first and second flange brackets 8, 10. The pressure vessel is provided with a pressurized fluid inlet conduit 12 for admitting a pressurized fluid system into the vessel, a concentrate outlet conduit 14 for withdrawing concentrate fluid from the vessel and a permeate outlet conduit 16 for discharging permeate fluid from the vessel. The inlet conduit is disposed adjacent to the first end closure 4 and the concentrate outlet conduit is located proximate to the second end closure 6, while the permeate outlet conduit traverses and exits from the second end closure 6. The inlet conduit 12 is in fluid flow communication with a pressurization pump 18 which suitably pressurizes a fluid system to be admitted into the pressure vessel. The concentrate outlet conduit 14 is equipped with a pressure control valve 20 to adjustably limit fluid flow through this outlet and therby selectively maintain a suitable pressure in the pressure vessel.

Figure 2:
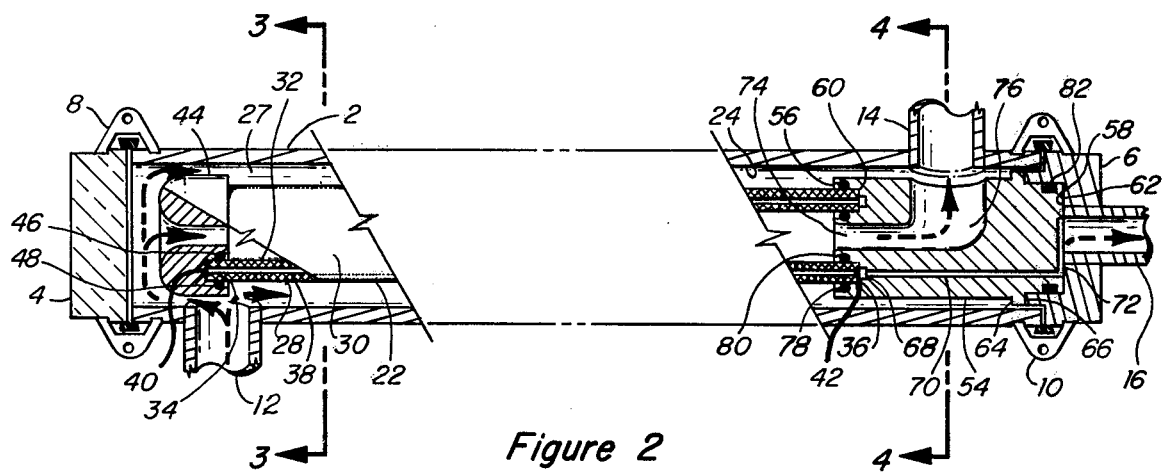
FIG. 2 is a side elevation view, partially sectioned, of the cell shown in FIG. 1.
Figure 3:
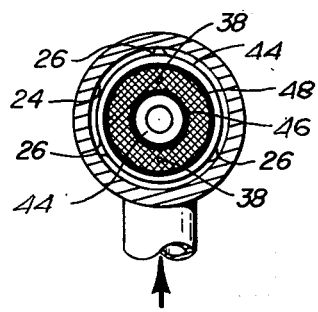
FIG. 3 is a transverse section along line 3—3 of FIG. 2.
Figure 4:
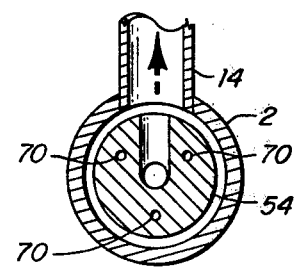
FIG. 4 is a transverse section along line 4—4 of FIG. 2.

Referring to FIG. 2, an osmotic membrane element 22 is disposed within the pressure vessel and maintained in spaced relationship to the inner surface 24 of the pressure vessel by suitable spacer means 26 as shown in FIG. 3. This spaced relationship defines a concentrate conveying, outer conduit 27 which is in communication with the outlet conduit 14.

The osmotic membrane element is in the form of a hollow, open-ended, rigid, tubular member. The tubular member comprises a porous wall 28 delimited by outer and inner semipermeable membrane coated surfaces 30, 32 and oppositely disposed first an second wall ends 34, 36, with the first wall end being adjacent to the first end closure 4 of the pressure vessel. One or more wall conduits 38, for conveying permeate fluid, are axially disposed in the tubular wall 28 with each such conduit terminating in first and second port means 40, 42 in the first and second wall ends 34, 36, respectively. When a plurality of wall conduits are used, they are preferably disposed substantially uniformly about the perimeter of the wall. The semipermeable membrane coated inner surface 32 of the osmotic membrane element defines an inner conduit for conveying concentrate fluid.

Figure 5:
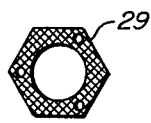
FIG. 5 is a transverse sectional view of a membrane element having a hexagonal outer surface and a cylindrical inner surface.

The osmotic membrane element may be made in accordance with procedures well known in the art as, for example, by initially preparing a multi-conduit, porous, ceramic core with one conduit being a principal inner conduit and the other conduit(s) being satelite conduits and subsequently applying to the outer surface of the core and the surface of the inner conduit a semipermeable membrane coating. Illustrative formulations and manufacturing processes for fabricating multi-conduit, porous, ceramic cores are set forth in U.S. Pat. No. 3,442,995. Formulations for semipermeable membrane coating compositions contining cellulose acetate and methods for applying such to rigid, porous cores, including die casting procedures, are described in U.S. Pat. No. 3,400,285 and U.S. Pat. No. 3,483,282. While porous ceramic cores are preferred as the membrane element, the rigid, porous membrane element may be fabricated from any other suitable material as, for example, porous metal. The osmotic membrane element may have any suitable configuration as, for example, cylindrical outer and inner surfaces as shown in FIG. 3 or a hexagonal outer surface 29 and cylindrical inner surface as shown in FIG. 5.

Figure 6:
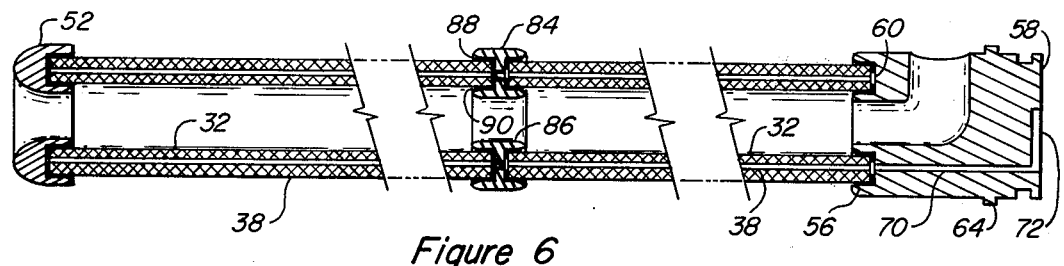
FIG. 6 is a longitudinal section, partially fragmented, of a membrane element system having two membrane elements connected in series.
Figure 7:
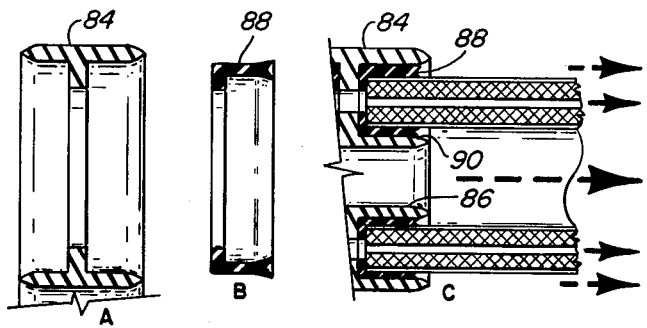
FIG. 7 is an exploded, partially fragmentary, longitudinal view showing the retainers and seals for coupling two membrane elements in series.
Figure 8:
FIG. 8 is a fragmented, longitudinal section of the membrane element of this invention showing a sealing cup disposed over and about the first wall end.

Means are provided for sealing the first wall end 34 to prevent concentrate fluid from entering the wall conduit port 40 at this end. In one embodiment, a sealing retainer 44 is disposed over and about the first wall end and sealingly engages inner and outer sealing rings 46, 48 which are disposed about the inner and outer surfaces 32, 30 of the osmotic membrane element inwardly adjacent to the first wall end. In a second embodiment, an elastomeric sealing cup 50 is disposed over and about the first wall end as shown in FIG. 8. A retaining cap 52, as shown in FIG. 6, can be slidably disposed over the sealing cup.

A fluid distributor 54, which may also be characterized as an end plug, is engagingly interposed between the second wall end 36 of osmotic membrane element and the second end closure 6 of the pressure vessel and is disposed in spaced relationship to the inner surface 24 of the pressure vessel. The fluid distributor, which may be fabricated from any suitable nonporous structural plastic material, has an inbound end 56 and an outbound end 58. The inbound end is provided with a socket 60 and the osmotic membrane element at an about the second wall end 36 is matingly disposed in this socket. The outbound end is matingly disposed within a recess 62 in the second end closure 6. The fluid distributor is provided with a laterally disposed alignment stop 64 which engages the front face 66 of the second end closure adjacent to the recess thereof.

Figure 9:
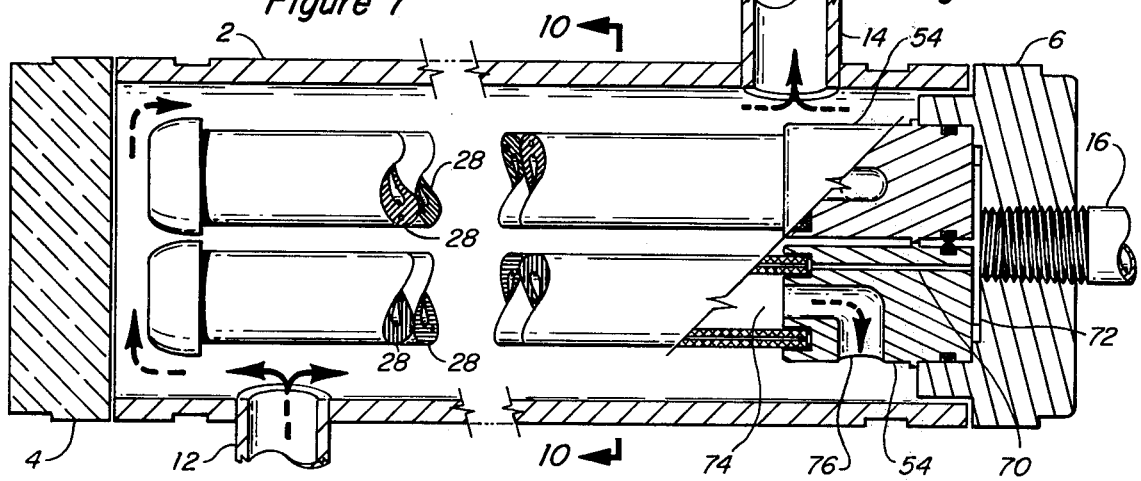
FIG. 9 is a schematic and fragmented, longitudinal section of the cell illustrated in FIG. 1 showing a cluster of four osmotic membrane elements arranged in parallel.
Figure 10:
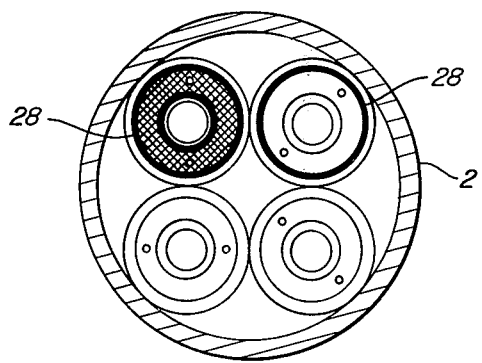
FIG. 10 is a transverse section along line 10—10 of FIG. 9.

The fluid distributor includes first and second transfer conduit systems. The first transfer conduit system extends fluid communication from the wall conduit(s) second port(s) to the permeate outlet 16 in the second end closure 6. In the first conduit system, the socket 60 is in communication with a recessed annular port 68 which, in turn, is in communication with one or more transfer conduits or channels 70. The transfer channels communicate with a collection channel 72 which exits in the permeate outlet 16. As shown in FIGS. 2 and 6, the collection channel is a recess in the outbound end of the fluid distributor while, as shown in FIG. 9, the collection channel 72 is a recess in the second end closure 16. The second transfer conduit system extends fluid communication from the inner conduit 32 at the second wall end 36 to the outer conduit 27 which is in communication with the concentrate outlet 14. The second transfer system includes a longitudinal conduit 74 having one end in communication with the inner conduit and its other end in communication with a transverse exit conduit 76 which communicates with the outer conduit.

Sealing means are provided to prevent fluid migration between the first and second transfer conduit means. The sealing means include: (a) an outer elastomeric sealing ring 78 interposed between the osmotic membrane element outer surface and the fluid distributor socket outer surface; (b) an inner elastomeric sealing ring 80 interposed between the osmotic membrane element inner surface and the fluid distributor socket inner surface; and (c) a peripheral elastomeric sealing ring 82 interposed between the engaging side walls of the fluid distributor outbound end and the recess in the pressure vessel second end.

As shown in FIG. 6, the osmotic membrane elements can be arranged in series. When so arranged, the intermediate opposing end sections of the osmotic membrane elements are coupled by outer and inner retainer-spacers 84, 86 overlying outer and inner sealing members 88, 90 for permitting mutually exclusive fluid flow through adjoining wall conduits 38 and through adjoining inner conduits 32.

As shown in FIG. 9, the osmotic membrane elements can be arranged in parallel within the cell. In this arrangement, there are a plurality of osmotic membrane elements and a corresponding number of fluid distributors with the permeate transfer conduit 70 of each fluid distributor having its outer end in communication with a common collection channel 72 which exits into the permeate outlet conduit 16.

In operation, a pressurizing pump 18 forces a fluid system at a suitable pressure through the inlet conduit 12 into the pressure vessel. The fluid system flows through the outer and inner conduits 27, 32 in a direction extending from the first end enclosure 4 towards the second end closure 6 of the pressure vessel. During the course of flow, fluid, comprising primarily solvent, passes through the outer and inner surfaces 30, 32 of the osmotic membrane element and is collected in the wall conduits 38 from which it is transferred by the fluid distributor 54 to the permeate outlet 16 in the second end closure. The initial fluid system flowing through the inner and outer conduits 32, 27 becomes more concentrated with respect to solute. Concentrate fluid from the inner conduit is transferred to the outer conduit, by the fluid distributor 54 and the combined concentrate fluid is discharged from the pressure vessel through the concentrate outlet 14.

While in the foregoing description and accompanying drawing there has been shown and described the preferred embodiment of this invention, it will be understood, of course, that minor changes may be made in the details of construction as well as in the combination and arrangement of parts without departing from the spirit and scope of the invention as claimed.

That which is claimed is:

1. A reverse osmosis cell for resolving a pressurized fluid system into concentrate and permeate fluids, comprising:

a pressure vessel having first and second oppositely disposed end closures, pressurized fluid inlet means, concentrate fluid outlet means and permeate fluid outlet means, said pressurized fluid inlet means being disposed adjacent to said first end closure, said concentrate fluid outlet means being disposed adjacent to said second end closure and said permeate fluid outlet means being disposed in and traversing said second end closure;

a hollow, open-ended, rigid, porous tubular member disposed within the pressure vessel in spaced relationship to the inner surface thereof, with the spaced relationship defining an outer conduit which is in communication with the concentrate outlet;

said tubular member comprising a wall delimited by inner and outer surfaces and oppositely disposed first and second wall ends, with each of the inner and outer surfaces being coated with a semipermeable membrane, said inner surface defining an inner conduit, and said first and second wall ends facing, respectively, said pressure vessel first and second end closures, a plurality of wall conduits axially disposed in said tubular wall with each of said wall conduits terminating in first and second port means in the first and second wall ends, respectively;

fluid distributor means interposed between and cooperatively joined with the second wall end of the tubular member and the second end closure of the pressure vessel, first and second transfer conduit means disposed within said fluid distributor means, said first transfer conduit means extending communication from the second port means of said wall conduits to the permeate outlet, said second transfer conduit means extending communication from the inner conduit at the second wall end to the outer conduit, and sealing means for preventing fluid migration between the first and second transfer conduit means; and sealing means for sealing the first wall end of the tubular member.

2. The reverse osmosis cell of claim 1 wherein said conduits are spaced substantially uniformly about the perimeter of said wall.

3. The reverse osmosis cell of claim 1 wherein the means for sealing the first wall end comprises an end elastomeric sealing member disposed over and about the first wall end.

4. The reverse osmosis cell of claim 3 which further includes a friction retainer overlying said end elastermeric sealing member.

5. The reverse osmosis cell of claim 1 wherein the means for sealing the first wall end comprise inner and outer elastomeric sealing rings disposed about the inner and outer surfaces of the tubular member inwardly adjacent to the first wall end and a socketed sealing retainer overlying the first wall end and sealingly engaging said sealing rings.

6. The reverse osmosis cell of claim 1 wherein the fluid distributor means has an inbound end and an outbound end, said inbound end being provided with a socket and said tubular member at and about said second wall end being disposed in said socket, said first transfer conduit means having intake port means in communication with said socket, and said distributor outbound end being disposed within a recess in said pressure vessel second end.

7. The reverse osmosis cell of claim 6 wherein the means for preventing migration between said first and second transfer conduit means comprise:

(a) outer elastomeric sealing means interposed between said tubular member outer surface and said fluid distributor socket, (b) inner elastomeric sealing means interposed between said tubular member inner surface and said fluid distributor socket, and (c) peripheral elastomeric sealing means interposed between the engaging side walls of the fluid distributor outbound end and the recess in the pressure vessel second end closure.

8. The reverse osmosis cell of claim 1 which includes a plurality of tubular members arranged in series with the intermediate opposing end sections of the tubular members being coupled by inner and outer retaining means including sealing means for permitting mutually exclusive fluid flow through adjoining wall conduit means and through adjoining inner conduits.

9. The reverse osmosis cell of claim 1 which includes a plurality of tubular members arranged in parallel and a corresponding number of fluid distributors, with the first transfer conduit means of each fluid distributor being in communication with a common permeate outlet in the pressure vessel second end closure.

* * * * *